(12) United States Patent
Rosenthal et al.

(10) Patent No.: US 12,719,271 B2
(45) Date of Patent: Aug. 25, 2026

(54) SWITCHED PARALLEL POWER SUPPLY BRANCHES

(71) Applicant: Aptiv Technologies AG, Schaffhausen (CH)

(72) Inventors: Thorsten Rosenthal, Mülheim an der Ruhr (DE); Sebastian Yousef, Bochum (DE); Andreas Fuchs, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 24 days.

(21) Appl. No.: 18/610,352

(22) Filed: Mar. 20, 2024

(65) Prior Publication Data

US 2024/0322563 A1 Sep. 26, 2024

(30) Foreign Application Priority Data

Mar. 21, 2023 (EP) .................................... 23163056

(51) Int. Cl.
*H02J 1/108* (2026.01)
*B60R 16/033* (2006.01)
*H02H 11/00* (2006.01)

(52) U.S. Cl.
CPC ............ *H02J 1/108* (2013.01); *B60R 16/033* (2013.01); *H02H 11/002* (2013.01)

(58) Field of Classification Search
CPC ....... H02J 1/108; B60R 16/033; H02H 11/002
USPC .................................................. 307/9.1, 10.1
See application file for complete search history.

(56) References Cited

U.S. PATENT DOCUMENTS 5,796,274 A * 8/1998 Willis .................. H03K 17/693 327/63
6,522,190 B1 * 2/2003 Malik ..................... H02J 1/108 307/64
11,170,964 B2 * 11/2021 Telefus ................ H02H 1/0007
2009/0322156 A1 12/2009 Gscheidle
2012/0292999 A1 11/2012 Henkel
2021/0159694 A1 * 5/2021 Schumacher ............ H02H 1/06

FOREIGN PATENT DOCUMENTS

EP 0985260 A1 3/2000
WO 9854814 A1 12/1998

OTHER PUBLICATIONS

Extended European Search Report for EP23163056.7, 10 pages, Sep. 15, 2023.

* cited by examiner

*Primary Examiner* — Michael R. Fin
(74) *Attorney, Agent, or Firm* — Miller Johnson

(57) ABSTRACT

An electrical power supply circuit includes at least two parallel power supply branches. Each power supply branch is adapted to be connected to or disconnected from a corresponding power source. Each power supply branch is adapted to be connected to or disconnected from a reference potential. Each power supply branch is adapted to avoid reverse current from flowing into the power supply branch.

9 Claims, 1 Drawing Sheet

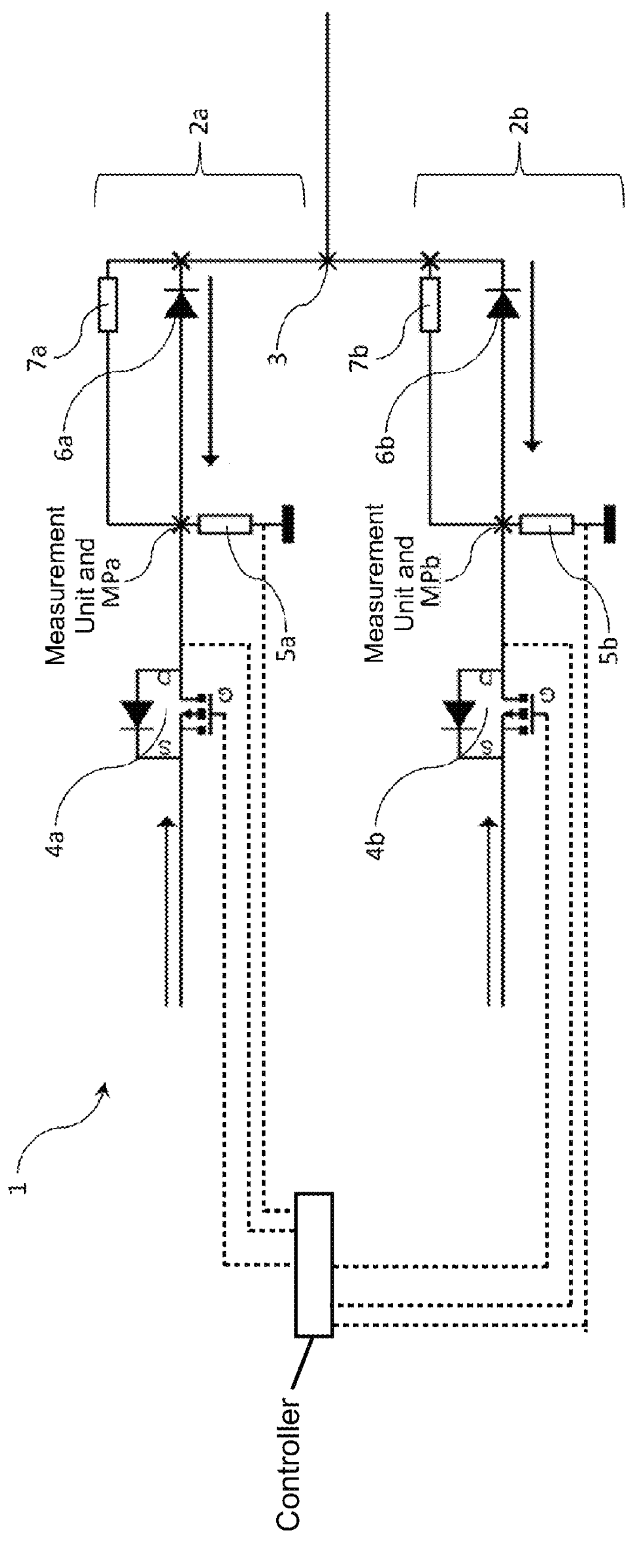
2a
2b
3
7a
7b
6a
6b
Measurement Unit and MPa
Measurement Unit and MPb
5a
5b
4a
4b
1
Controller

SWITCHED PARALLEL POWER SUPPLY BRANCHES

CROSS-REFERENCE TO RELATED APPLICATIONS

This application claims priority to EP 23 163 056 filed Mar. 21, 2023 the entire disclosure of which is incorporated by reference.

FIELD

The present invention relates to an electrical power supply circuit and more particularly to an electrical power supply circuit for automotive applications.

BACKGROUND

Redundant power supplies are used in variety of applications ranging from critical computer systems to vehicles. The basis of a redundant power supply are two or more power sources connected in parallel. Even in case of a failure of one of the power sources, the other power source (s) would still be able to supply power to a load connected to the redundant power supply. In this way, redundancy improves the robustness, fail-safety and availability.

However, what is needed is a way to monitor the status of a redundant power supply itself and to be able to detect a possible failure in one of its branches in order to initiate corresponding measures. At the same time, such additional safety measures shall be implemented with a minimum of additional components to reduce complexity and costs.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present invention addresses those needs by the subject matter of the independent claims. Advantageous embodiments are defined in the dependent claims.

Accordingly, in a first aspect, the present invention relates to an electrical power supply circuit comprising at least two parallel power supply branches, wherein each power supply branch is adapted (a.) to be connected to or disconnected from a corresponding power source; (b.) to be connected to or disconnected from a reference potential; and (c.) to avoid reverse current from flowing into the power supply branch.

Each power supply branch may comprise a semiconductor switch comprising an input and an output, wherein the input is adapted to be connected to or disconnected from a power source; and/or a first resistor, wherein a first end of the first resistor is adapted to be connected to or disconnected from the output of the semiconductor switch and a second end of the first resistor is adapted to be connected to or disconnected from a the reference potential; and/or a diode between the output of the semiconductor switch and the common output of the electrical power supply circuit.

As will be described in more detail below, a diode in each of the power supply branches avoids a reverse current into the power supply branch in case of a failure of the branch. Thus, the orientation of the diode may be such that it prevents a reverse current from flowing from the common output of the electrical power supply circuit into the respective power supply branch. Reverse currents may cause further damages to the faulty branch and may result in short circuits across the intact power supply branch(es) leading to a failure of the entire power supply circuit. Thus, the diodes increase the robustness, fail-safety and availability of the power supply circuit.

The semiconductor switches allow to disconnect a particular power supply branch from the output of the power supply circuit. At the same time, a resistor pulls the output of the disconnected semiconductor switch to a defined ground potential (e.g. 0V). If, however, the diode of that particular branch is subject to a failure, a faulty reverse current from the other power supply branch(es) through the diode would cause the potential at the resistor to be higher than ground. Therefore, a failure of the diode can be detected, and the particular power supply branch can be shut down by means of the semiconductor switch avoiding additional harm.

Also, the potential at the resistor of each power supply branch allows to detect a failure of the power source associated with that particular branch. In case of normal operations the potential at the resistor is expected to be substantially above ground, whereas a failure in the power source would cause the potential to be at or near ground. Similarly, a failure in a semiconductor switch can be detected by measuring the potential at its output and comparing it against an expected potential.

In this way, the power supply circuit according to the invention can perform self-tests to detect a failure of one of its components and facilitates initiating corresponding measures, e.g. disconnecting a faulty power supply branch and/or issuing a warning.

In general, the first end of the first resistor may be adapted to be connected to the output of the semiconductor switch by a switch and/or the second end of the first resistor may be adapted to be connected to the reference potential by a switch. The switches may be semiconductor switches. In this way, the first resistor is not required to be permanently connected to the output of the semiconductor switch and/or ground.

Each power supply branch may further comprise a second resistor with a first end being adapted to be connected to the output of the semiconductor switch and a second end being adapted to be connected to or disconnected from the output of the electrical power supply circuit in order to form a voltage divider with the first resistor. The second resistor in the context of the present invention is optional. In this way, a different defined potential than ground can be established at the output of the semiconductor switch. For example, in case of resistors with the same resistance, the defined potential may be half of the supply voltage.

In general, the first end of the second resistor may be adapted to be connected to the output of the semiconductor switch by a switch and/or the second end of the first resistor may be adapted to be connected to the output of the electrical power supply circuit by a switch. The switches may be semiconductor switches. In this way, the second resistor is not required to be permanently connected to the output of the semiconductor switch and/or the output of the electrical power supply circuit.

Alternatively, the first end of the first resistor may be permanently connected to the output of the semiconductor switch, and/or the second end of the first resistor may be permanently connected to ground, and/or the first end of the second resistor may be permanently connected to the output of the semiconductor switch, and/or the second end of the second resistor may be permanently connected to the output of the electrical power supply circuit. In this way, additional components, e.g. switches for connecting the resistors are not needed.

The semiconductor switch may be a MOSFET. MOSFETs can switch high load currents with a comparably small control current and fast switching times.

The semiconductor switch may comprise overcurrent protection. For example, the semiconductor switch may shutdown if the current flowing through the switch exceeds a predetermined threshold. In this case, overheating and damages to the switch and the respective power supply branch can be avoided.

The electrical power supply circuit may further comprise a controller configured to switch the semiconductor switches, to take signals corresponding to the potential at the output of the semiconductor switches as input, and/or to connect the first end of the first resistor of each power supply branch to the output of the semiconductor switch, and/or to connect the second end of the first resistor of each power supply branch to ground, and/or to connect the first end of the second resistor to the output of the semiconductor switch of each power supply branch, and/or to connect the second end of the second resistor of each power supply branch to the output of the electrical power supply circuit. In this way, the controller can perform a self-test of the electrical power supply circuit as will be described in more detail below. The controller may be a microcontroller. The controller may have an Automotive Safety Integrity Level-(ASIL)-B-qualification, more ideally an ASIL-C and most ideally an ASIL-D qualification. In case of an automotive application the self-test may be performed once per driving cycle. Alternatively or additionally, the self-test may be performed before a critical function is activated.

The electrical power supply circuit may further comprise a measurement unit configured to measure the potential at the output of the semiconductor switches. The measurement unit may comprise an Analog-to-Digital Converter (ADC). The ADC may be connected to the controller. Using an ADC allows to map the potentials measured at the output of the semiconductor switches to be mapped to digital values which can be read by the controller for use in a control software executed at the controller.

The controller may be adapted to output a failure signal and/or to set a failure flag if the potential at the output of at least one semiconductor switch deviates from a predetermined value by a predetermined amount. In this way, a failure may be detected by the controller and corresponding measures taken. For example, a warning may be provided to a driver of a vehicle or the vehicle may refuse to re-start if a failure is detected in a current driving cycle.

The electrical power supply circuit may comprise two power supply branches. This may provide a failover if one of the two power supply branches shows a failure. Using two branches substantially improves the robustness, fail-safety and availability with a minimum of additional components.

The electrical power supply circuit may be configured for an automotive application. Modern cars comprise a lot of functions being controlled by electronic control units that benefit from power supplies for the sake of safety and availability. This is in particular true for safety critical functions used for assisted and/or automated driving such as in autonomous cars.

Another aspect of the present invention relates to a method of diagnosing an electrical power supply circuit as disclosed herein. The method comprises the step of measuring a potential in a first power supply branch while all power supply branches are connected to a corresponding power source. As will be explained in more detail below, this facilitates detecting a reverse current, for example in a diode of the power supply branch being switched off. If a reverse current outside of normal conditions is detected, a warning may be issued and/or a failure flag may be set.

The method may further comprise the step of disconnecting the first power supply branch from a corresponding power source while the other power supply branches are connected to a corresponding power source. This results in a reverse voltage being applied across the diode in the first power supply branch. In case of a failure of the diode, a reverse current would flow through the diode and raise the potential at the first resistor which can be detected as described herein. Thus, a possible reverse current of the diode in the first power supply branch can be detected by a self-test before and a potentially harmful situation can be avoided by initiating corresponding counter measures such as for example shutting down the first power supply branch and/or issuing a warning.

The method may further comprise the step of outputting a failure signal and/or setting a failure flag if the measured potential in the first power supply branch deviates from a predetermined value by a predetermined amount. In this way, corresponding measures may be taken. For example, the failure may be provided to a driver of vehicle as a warning or the vehicle may refuse to re-start if a failure is detected in a current driving cycle.

The method may further comprise the step of inhibiting the start or restart of a vehicle comprising the electrical power supply circuit when a failure condition has been detected. Thus, potential harmful situations can be avoided and/or maintenance can be done to the vehicle.

Another aspect of the present invention relates to a computer program comprising instructions which, when executed by a computer, cause the computer to perform a method as described herein.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 1 illustrates an example embodiment of the present invention.

In the drawings, reference numbers may be reused to identify similar and/or identical elements.

DETAILED DESCRIPTION

Introduction

For the sake of brevity, only a few embodiments will be described below. The person skilled in the art will recognize that the features described with reference to these specific embodiments may be modified and combined in different ways and that individual features may also be omitted. The general explanations in the sections above also apply to the more detailed explanations below.

FIG. 1 illustrates an example embodiment of the present invention by way of a power supply circuit 1 comprising a first power supply branch **2*a* and a second power supply branch 2$b$ being connected in parallel. As such, the power supply circuit 1 is a redundant power supply circuit. Both branches 2$a$ and 2$b$ are connected to a common output 3 of the electrical power supply circuit. A load (not shown in FIG. 1) such as a motor, sensor, control unit, etc. may be connected to the common output 3. In the example embodiment of FIG. 1 the power supply circuit 1** comprises two parallel branches, but the invention is not restricted to two branches and more branches would generally add to the robustness and fail-safety of the circuit.

In the example of FIG. 1 each power supply branch 2$a$, 2$b$ comprises a semiconductor switch 4$a$ and 4$b$, respectively, comprising an input and an output. The input can be connected to a power source (not shown in FIG. 1). Thus, the semiconductor switches 4$a$ and 4$b$ allow the respective branch 2$a$ and 2$b$ to be connected to or disconnected from the power source. Each power source provides a voltage (such as e.g. 12V, 24V, 48V etc.) and a current (indicated by corresponding arrows in FIG. 1) depending on the load connected to the common output 3 of the power supply circuit 1. To avoid potential reverse currents into the power sources, each power source should provide the same voltage.

The semiconductor switches 4$a$ and 4$b$ may be or comprise MOSFTEs. Also, the semiconductor switches 4$a$ and 4$b$ may comprise high-side drivers such that the switches 4$a$, 4$b$ can be controlled by lower voltage level than the voltage that is actually switched by the switches 4$a$, 4$b$. For example, the high-side drivers may allow the switches 4$a$, 4$b$ to be controlled by voltage levels found in transistor-transistor logic (TTL) or complementary metal-oxide-semiconductor (CMOS) logic. As such, operation of the switches may for example be controlled by a microcontroller (not shown in FIG. 1).

Also, the semiconductor switches 4$a$, 4$b$ may comprise overcurrent protection that shuts down a switch in case of overcurrent or excessive heat. For example, electronic fuses (e-fuses) may be provided as overcurrent protection. These are integrated circuits that replace larger conventional fuses or other protection devices.

In the example of FIG. 1 the power supply circuit 1 also comprises a first resistor 5$a$ and 5$b$, respectively, in each branch 2$a$ and 2$b$, respectively. A first end of the first resistor 5$a$, 5$b$ is adapted to be connected to the output of the corresponding semiconductor switch 4$a$ and 4$b$, respectively. A second end of the first resistor 5$a$, 5$b$ is adapted to be connected to ground. In the example of FIG. 1, the mentioned connections between the first resistor 5$a$, 5$b$ to the output of the corresponding semiconductor switch 4$a$ and 4$b$, as well as to ground are permanent connections. In other example embodiments, all or some of the mentioned connections are not permanent. For example, the resistors 5$a$, 5$b$ may permanently be connected to ground but the connection to the output of the corresponding semiconductor switch 4$a$ and 4$b$ may be realized by a switch such as a semiconductor switch. Thus, the resistors 4$a$ and 4$b$ may be integrated into the power supply circuit 1 as needed, for example to perform a self-test as will be outlined in more detail below.

The resistors may have example values of 10 kΩ, but other values may be used as well depending on application. Also, the values of the resistors 5$a$ and 5$b$ are conveniently the same, but this is not required.

In the example of FIG. 1 the power supply circuit 1 also comprises diodes 6$a$ and 6$b$ between the output of the semiconductor switches 4$a$ and 4$b$, respectively, and the common output 3 of the electrical power supply circuit 1. The orientation of the diodes 4$a$ and 4$b$ is such that they prevent a reverse current (indicated by corresponding arrows in FIG. 1) from flowing from the common output 3 into the respective power supply branch 2$a$, 2$b$.

The example of FIG. 1 also shows optional second resistors 7$a$ and 7$b$, respectively. The optional resistors 7$a$ and 7$b$ are arranged between the output of the semiconductor switch 4$a$ and 4$b$, respectively, and the common output 3 of the power supply circuit 1. As such, the resistors 7$a$ and 7$b$ form voltage dividers with the first resistors 5$a$ and 5$b$, respectively. The middle junction of each voltage divider is connected to the output of the respective semiconductor switch 4$a$, 4$b$.

Irrespective of whether the optional second resistors 7$a$, 7$b$ are present, the output of a semiconductor switch 4$a$, 4$b$ is pulled to a defined potential even if the corresponding switch is off, e.g. in a non-conducting state. This is caused by the first resistors 5$a$, 5$b$ being connected or adapted to be connected to ground as shown in FIG. 1. Based thereon, a self-test of the power supply circuit 1 to meet certain safety goals can be performed as will be described in the following.

To ensure freedom from interference between both power supply branches 2$a$ and 2$b$ according to the Automotive Safety Integrity Level-(ASIL-) D, the following safety goals (SG) shall be met:

- SG 1a: An overcurrent $I_{max\_KL30\_x\_short}$ for a time duration of $t_{short}$ (hard shortcut) through both branches 2$a$, 2$b$ at the same time shall be avoided.
- SG 1b: An overcurrent $I_{max\_long\_KL30\_x\_long}$ for a time duration of $t_{long}$ (creeping shortcut) through both branches 2$a$, 2$b$ the same time shall be avoided.
- SG 2a: A reverse current $I_{revmax\_KL30\_x\_short}$ for $t_{short}$ into the corresponding branch 2$a$, 2$b$ shall be avoided.
- SG 2b: A reverse current $I_{revmax\_KL30\_x\_long}$ for $t_{long}$ into the corresponding branch shall be avoided.

An example value for $t_{short}$ is 500 us and an example value for $t_{long}$ is 100 ms. The values are in general application dependent. The same is true for the current values $I_{max\_KL30\_x\_short}$, $I_{max\_long\_KL30\_x\_long}$, $I_{revmax\_KL30\_x\_short}$ and $I_{revmax\_KL30\_x\_long}$.

The safety goals SG 2a and SG 2b are satisfied by the diodes 6$a$ and 6$b$ in combination with the self-test and safe state operation described below. The self-test will avoid a latent fault. To achieve all targeted safety goals, the following described process for self-testing can be used to diagnose and mitigate erroneous components or similar failure cases. As mentioned, it is assumed that the power sources feeding the corresponding power supply branches 2$a$ and 2$b$, respectively, are active voltage supplies with a similar voltage $U_a$ and $U_b$, respectively, during the diagnostic. For example, both voltage supplies may provide approximately 12V, i.e. $U_a \approx U_b$. Accordingly, the voltage $U_O$ at the common output 3 of the power supply circuit 1 would also be approximately at 12V.

The following table shows the two test cases T1 and T2 (first column) of the circuit 1 in normal mode, i.e. at normal operation in which both switches 2$a$ and 2$b$ are ON (second column), i.e. expected to be conducting and the circuit 1 provides current to a load. The table also shows the expected potentials $U_{MPa}$ and $U_{MPb}$ at the points MPa and MPb, respectively (see FIG. 1), in case of no failure (third column) and failure (fourth column), as well as the failure modes that are supposed to be detected by the respective test case (fifth column) and the actions to be performed in case of a failure that bring the circuit into a safe state operation (last column).

The potentials at the test points MPa and MPb may be measured by means of an analog-to-digital converter (ADC)

for example and a digital representation of the measured potential may be fed to a microcontroller performing and monitoring the self-test.

| Diagnosis for all paths/branches: | | | | | |
|---|---|---|---|---|---|
| test case | transistor states for the test case | test pass criterion (no failure) | test fail criterion (failure) | failure modes to be detected | safe state operation |
| T1 | switch 2a = ON switch 2b = ON | $U_{MPa} \approx U_a$ | $U_{MPa} \approx ½ U_O$ | switch 2a stuck (non-conductive) | switch 2a OFF switch 2b ON ($U_O = U_b$) |
| T2 | switch 2a = ON switch 2b = ON | $U_{MPb} \approx U_b$ | $U_{MPb} \approx ½ U_O$ | switch 2b stuck (non-conductive) | switch 2a ON switch 2b OFF ($U_O = U_a$) |

With respect to the fourth column (test fail criterion), it should be mentioned that the expected potential ½ $U_O$ is valid in case of a second resistor 7*a*, 7*b* being present in the circuit 1 having the same value as the first resistor 5*a*, 5*b* and, thus, forming a voltage divider. The expected potential $U_{MPa}$ and $U_{MPb}$ would be different if the second resistor 7*a*, 7*b* would have a different resistance compared to the first resistor 5*a*, 5*b* or if the second resistor 7*a*, 7*b* would not be present. In the latter case, for example, the expected potential at the points MPa or MPb in case of a failure would be the ground potential, i.e. 0V as the first resistor 5*a*, 5*b* would pull the points MPa or MPb to ground if the corresponding switches 4*a* or 4*b* would be non-conducting due to a failure (assuming that the diodes 6*a* or 6*b* would be intact and avoid reverse currents from flowing into the corresponding branch).

With respect to the fifth column, it should be mentioned that additional measures can be taken in case of a detected failure. For example, a microcontroller controlling the self-test may set a test flag in case of a failure in test case T1 or T2. The flag may indicate whether the failure relates to test case T1 or to test case T2. If the power supply circuit 1 is installed in a vehicle, the start or restart of the vehicle may be inhibited. A restart may be inhibited after the end of the current driving cycle.

The following table shows a diagnosis of the two branches 2*a* and 2*b*, respectively, corresponding to test cases T3 and T4:

| Diagnosis of single path/branch | | | | | |
|---|---|---|---|---|---|
| test case | transistor states for the test case | test pass criterion (no failure) | test fail criterion (failure) | failure modes to be detected | safe state operation |
| T3 | switch 2a = OFF switch 2b = ON | $U_{MPa} \approx ½ U_O$ | $U_{MPa} >> ½ U_O$ | 1. shortcut in diode 6a 2. Switch 4a stuck (conductive) | switch 2a ON switch 2b OFF ($U_O = U_a$) |
| T4 | switch 2a = ON switch 2b = OFF | $U_{MPb} \approx ½ U_O$ | $U_{MPb} >> ½ U_O$ | 1. shortcut in diode 6b 2. Switch 4b stuck (conductive) | switch 2a OFF switch 2b ON ($U_O = U_b$) |

Also here, it should be mentioned with respect to the third and fourth column that the expected potential ½ $U_O$ is valid in case of a second resistor 7*a*, 7*b* being present in the circuit 1 having the same value as the first resistor 5*a*, 5*b* and, thus, forming a voltage divider. The expected potential $U_{MPa}$ and $U_{MPb}$ would be different if the second resistor 7*a*, 7*b* would have a different resistance compared to the first resistor 5*a*, 5*b* or if the second resistor 7*a*, 7*b* would not be present. In the latter case, for example, the expected potential at the points MPa or MPb would be the ground potential, i.e. 0V as the first resistor 5*a*, 5*b* would pull the points MPa or MPb to ground.

Similarly as above, with respect to the fifth column in the second table, it should be mentioned that additional measures can be taken in case of a detected failure. For example, a microcontroller controlling the self-test may set a test flag in case of a failure in test case T3 or T4. The flag may indicate whether the failure relates to test case T3 or to test case T3. If the power supply circuit 1 is installed in a vehicle, the start or restart of the vehicle may be inhibited. A restart may be inhibited after the end of the current driving cycle.

As mentioned above, safety goals SG 2a and SG 2b are satisfied by the diodes 6*a* and 6*b* in combination with the self-test and safe state operation described above. The safety goals SG 1a and SG 1b are satisfied by the semiconductor switches 4*a* and 4*b* as follows: Assume the failure is a short cut to ground on the load side of the power supply circuit 1, e.g. due to a defect electronic component on the side of attached loads. In this case, a potential overcurrent (e.g. above 3A in an example) can be detected by the semiconductor switches 4*a* and 4*b*. To this end, and as described above, the switches 4*a*, 4*b* may comprise high-side drivers with overcurrent protection, e.g. e-fuses. The switches 4*a*, 4*b* may switch off in case of overcurrent within a predetermined time, e.g. within 100 us or less. As an additional safety measure, the switches 4*a* and 4*b* may be of different types, e.g. to ensure freedom from inference (FFI) in ASIL-D.

The self-test of the power supply circuit 1 described above may be performed by a microcontroller or similar control unit. To this end, the method of diagnosing the electrical power supply circuit 1 as disclosed herein may be implemented in hardware or in software or may be implemented partly in hardware and partly in software. Hardware suitable for implementing a method and an apparatus according to the present invention include a central processing unit (CPU), a microcontroller, an application-specific integrated circuit (ASIC) or the like. A (full or partial) software implementation may include compiling source code to obtain machine readable instructions which, when executed, cause a computer, CPU, microcontroller or the like to perform all or part of the method steps described herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. An electrical power supply circuit comprising:
- a plurality of parallel power supply branches, wherein each respective power supply branch of the plurality of parallel power supply branches:
  - is configured to be connected to or disconnected from a corresponding power source,
  - is configured to be connected to or disconnected from a respective reference potential,
  - is configured to avoid reverse current from flowing into the respective power supply branch,
  - includes a respective first resistor including:
    - a first end configured to be connected to or disconnected from an output of a respective semiconductor switch, and
    - a second end configured to be connected to or disconnected from the respective reference potential, and
  - includes a respective second resistor including:
    - a first end, and
    - a second end; and
- a controller configured to at least one of:
  - switch the respective semiconductor switch,
  - take signals corresponding to a potential at the output of the respective semiconductor switch as input,
  - selectively connect the first end of the respective first resistor of each respective power supply branch of the plurality of parallel power supply branches to the output of the respective semiconductor switch,
  - selectively connect the second end of the respective first resistor of each respective power supply branch of the plurality of parallel power supply branches to ground,
  - selectively connect the first end of the respective second resistor to the output of the respective semiconductor switch of each respective power supply branch of the plurality of parallel power supply branches, or selectively connect the second end of the respective second resistor of each respective power supply branch of the plurality of parallel power supply branches to the output of the electrical power supply circuit.

2. The electrical power supply circuit of claim 1 wherein each respective power supply branch of the plurality of parallel power supply branches includes at least one of:

the respective semiconductor switch including an input and the output, wherein the input is adapted to be connected to or disconnected from the corresponding power source; or a respective diode between the output of the respective semiconductor switch and a common output of the electrical power supply circuit.

3. The electrical power supply circuit of claim 2 wherein:

each respective power supply branch of the plurality of parallel power supply branches includes the respective semiconductor switch, the first end of the respective second resistor is configured to be connected to or disconnected from the output of the respective semiconductor switch, and the second end of the respective second resistor is configured to be connected to or disconnected from the output of the electrical power supply circuit in order to form a voltage divider with the respective first resistor.

4. The electrical power supply circuit of claim 3 wherein at least one of:

the first end of the respective first resistor is permanently connected to the output of the respective semiconductor switch, the second end of the respective first resistor is permanently connected to ground, the first end of the respective second resistor is permanently connected to the output of the respective semiconductor switch, or the second end of the respective second resistor is permanently connected to the output of the electrical power supply circuit.

5. The electrical power supply circuit of claim 2 wherein the respective semiconductor switch includes overcurrent protection.

6. The electrical power supply circuit of claim 2 further comprising a measurement unit configured to measure a potential at the output of the respective semiconductor switch of each respective power supply branch of the plurality of parallel power supply branches.

7. The electrical power supply circuit of claim 1 wherein the controller is adapted to at least one of:

output a failure signal, or set a failure flag if the potential at the output of at least one semiconductor switch of a set of semiconductor switches deviates from a predetermined value by a predetermined amount, wherein the set of semiconductor switches includes the respective semiconductor switch of each respective power supply branch of the plurality of parallel power supply branches.

8. The electrical power supply circuit of claim 1 wherein the plurality of parallel power supply branches is exactly two parallel power supply branches.

9. The electrical power supply circuit of claim 1 wherein the electrical power supply circuit is configured for an automotive application.

* * * * *